United States Patent

[11] 3,628,339

[72] Inventor Joe A. Porter
 Whittier, Calif.
[21] Appl. No. 6,058
[22] Filed Jan. 27, 1970
[45] Patented Dec. 21, 1971
[73] Assignee Beckman Instruments, Inc.

[54] FLUID SAMPLE STREAM CONDITIONING
 17 Claims, 1 Drawing Fig.
[52] U.S. Cl. ..................................................... 62/5
[51] Int. Cl. ..................................................... F25b 9/02
[50] Field of Search ........................................... 62/5

[56] References Cited
 UNITED STATES PATENTS
 2,522,787 9/1950 Hughes ........................ 62/5
 2,698,525 1/1955 Lindemblad ................. 62/5
 2,741,899 4/1956 Von Linde .................... 62/5
 2,763,150 9/1956 O'Barmore ................... 62/5
 3,460,373 8/1969 Ford ............................. 62/5

Primary Examiner—William J. Wye
Attorneys—William F. McDonald and Robert J. Steinmeyer ABSTRACT: The instant disclosure relates to apparatus for and a method of conditioning a fluid sample stream, for example, for passage through an analytical instrument. The method involves passing a gas under pressure into a vortex tube so that the gas separates into two exit streams from the vortex tube, a heated stream and a cooled stream. The cooled stream is passed into heat exchange relationship with the fluid sample stream so that the fluid sample is cooled. The heated stream is passed into heat exchange relationship with the cooled fluid sample so that the fluid sample is heated, whereby the fluid sample stream is conditioned. The apparatus includes a fluid conduit having an inlet and an outlet. A hollow heat exchange jacket having a cooling section and a heating section surrounds the conduit so as to form a heating section and a cooling section in the conduit. Means are provided for introducing a gas under pressure into a vortex tube so that the gas separates into two exit streams from the vortex tube, a heated stream and a cooled stream. Means are provided for passing the heated gas stream into the heating section of the heat exchange jacket and means are also provided for passing the cooled gas stream into the cooling section of the heat exchange jacket. Suitable means are provided for passing the fluid sample stream through the conduit so that it travels through the section surrounded by the cooling section of the jacket and through the section surrounded by the heating section, whereby the fluid sample stream is cooled and heated.

PATENTED DEC 21 1971   3,628,339
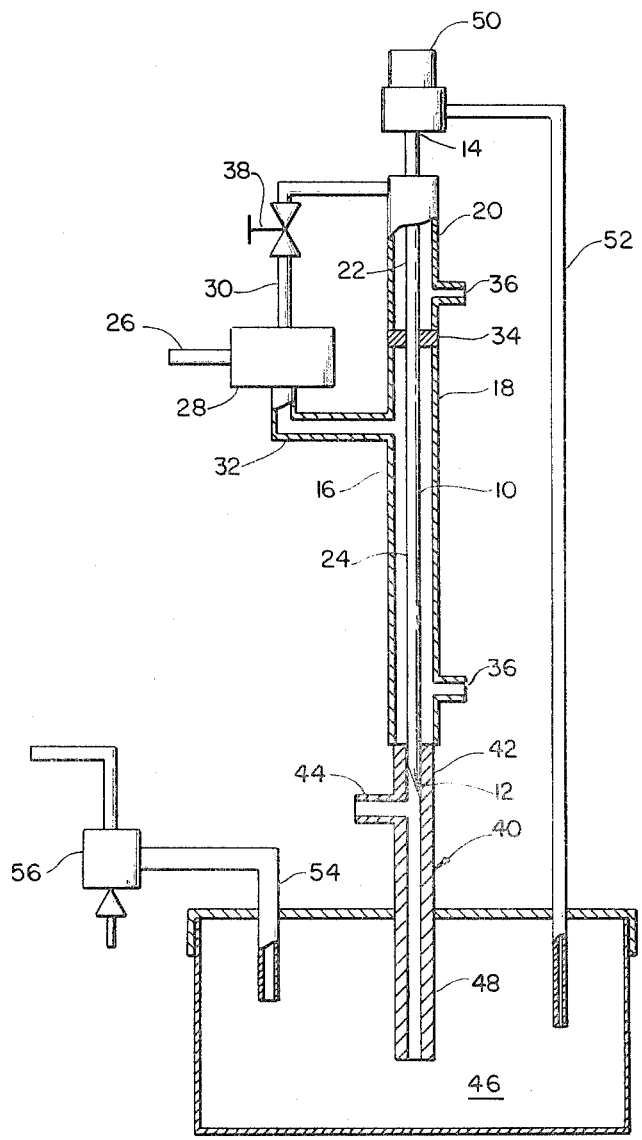
INVENTOR.
JOE A. PORTER
BY William F. McDonald
ATTORNEY

FLUID SAMPLE STREAM CONDITIONING

BACKGROUND OF THE INVENTION

This invention relates to conditioning a fluid sample stream. It is particularly applicable to conditioning a gas stream for analysis. For example, if a gas stream is to be analyzed for its oxygen content, it will be passed through an oxygen sensing instrument. If the gas stream contains water vapor at a concentration such that some water vapor can separate out in the analytical apparatus, the separated water vapor can interfere with the analysis and cause a false reading by the instrument. Accordingly, it is usually desired to condition the fluid sample stream, in this case a water vapor containing gas, by lowering the water vapor content in the gas stream to such a level that any water vapor remaining in the gas stream after the conditioning operation will not condense out in the analytical instrument. In other cases it may be desired to first heat the fluid sample stream and then cool it.

Apparatus for conditioning a fluid sample stream has been known in the past. Past apparatus and processes for conditioning the fluid sample have normally involve cooling the sample stream so as to condense out water vapor and then heating the stream to bring it above the saturation point again so that any remaining water vapor will not condense out in the analytical instrument. Relatively cumbersome apparatus has been used to accomplish this purpose, however. A complicated cooling system and associated pumps and piping have been used for the cooling step and similarly a complicated heat generator, heat exchanger and related pumps and piping have been required for the heating step. Yet another set of piping and pumps have been required to pull or push the fluid sample stream through the heat exchanger and on into and through the analytical instrument.

In general, the more complicated a process is or the more complicated apparatus is, the more difficult and expensive it is to operate and maintain. Thus, there has been a need in this field to improve the reliability of the sample analysis and conditioning process by providing a simpler, more reliable process and apparatus for conditioning the fluid sample stream.

SUMMARY OF THE INVENTION

It is an object of the instant invention to provide apparatus for and a method of conditioning a fluid sample stream which is simpler and more reliable than prior art processes and apparatus.

Advantageously, the instant invention requires only a source of compressed air to provide the working fluid for the system and to satisfy all the pumping requirements of the system. Thus, desirably, outside of the source of compressed gas, only a single pump (operated by the compressed gas) is needed for the entire system. It is a further advantage of the process and apparatus of the instant invention that the conditioning of the fluid sample stream is easily controlled and regulated. The apparatus desirably is quite simple and has few moving parts, so that maintenance is reduced to a minimum.

The instant invention relates to apparatus for conditioning a fluid sample stream. The apparatus includes a fluid conduit having an inlet and an outlet. A hollow heat exchange jacket, having a cooling section and a heating section, surrounds the conduit so as to form a heating section and a cooling section in the conduit. Means are provided for introducing a gas under pressure into a vortex tube so that the gas separates into two exit streams from the vortex tube, a heated stream and a cooled stream. Means are also provided for passing the heated gas stream into the heating section of the heat exchange jacket and for passing the cooled gas stream into the cooling section of the heat exchange jacket. Means are provided for passing the fluid sample stream through the conduit so that it travels through the section surrounded by the cooling section of the jacket and through the section surrounded by the heating section whereby the fluid sample stream is cooled and heated, either cooled first and then heated, or heated first and then cooled.

The process according to the instant invention relates to conditioning a fluid sample stream wherein a gas under pressure is passed into a vortex tube so that the gas separates into two exit streams from the vortex tube, a heated stream and a cooled stream. The cooled stream is passed into heat exchange relationship with the fluid sample stream so that the fluid sample is cooled. The heated stream is passed into heat exchange relationship with the fluid sample stream so that the fluid sample is heated, whereby the fluid sample stream is conditioned.

Other objects and advantages of the instant invention will be apparent from the following description in conjunction with the accompanying drawing.

BRIEF DESCRIPTION OF THE DRAWING

The single figure of the drawing shows an apparatus according to the instant invention which is also suitable for practicing the process according to the instant invention.

DETAILED DESCRIPTION

Referring now to the drawing, the apparatus according to the instant invention may be seen to include a fluid conduit, shown as a vertically disposed tube 10. Tube 10 has an inlet 12 and an outlet 14. A hollow heat exchange jacket 16, having a cooling section 18 and a heating section 20, surrounds conduit tube 10 so as to form a heating section 22 and a cooling section 24 in the conduit. Means, such as supply line 26, are provided for introducing a gas under pressure into a vortex tube 28. Vortex tubes are also called Ranque tubes or Hilsch tubes or hot/cold pipes. These devices are now well known in the art. A description of the construction and some of the operating features of such a tube may be found in U.S. Pat. No. 1,952,281, which issued Mar. 27, 1934, to Ranque. In general, a vortex tube includes a chamber having the shape of a surface of revolution such as a cylinder. The chamber has an inlet pipe for tangentially introducing the gas to be treated into a central region of the chamber. A gyratory motion is imparted to the gas as it enters the chamber, and means, such as a restricted orifice between one end of the cylinder and the tangential inlet, divide the gas into two concentric sheets moving along each other so that the outer sheet is compressed by the inner sheet. The work thus produced causes a substantial rise in temperature in the outer sheet and a corresponding drop in the temperature of the inner sheet.

Thus, in the vortex tube 28 of the instant invention, the gas separates into two exit streams from the vortex tube, a heated stream and a cooled stream. Means such as pipe 30 are provided for passing the heated gas stream into the heating section 20 of jacket 16. Similarly, means such as pipe 32 are provided for passing the cooled gas stream into the cooling section 18 of jacket 16.

The two sections 18, 20 of the heat exchange jacket are separated from one another by separator 34. Each has its own discharge vent 36. As shown, the conduit tube 10 is generally vertically disposed and when the fluid sample is to be first cooled and then heated, the cooling section 24 of the conduit is below the heating section 22 of the conduit. The temperature differential between the heating sections 20, 22 and the cooling sections 18, 24 is controlled by means of a valve 38 located in pipe 30 which regulates the passage of the heated gas stream from the vortex tub 28 into the heating section 20 of jacket 16.

A vertically disposed T or Y-shaped junction tube 40 is connected at its upper arm 42 to the inlet 12 of the conduit and at its base 44 to a source of sample gas. When the fluid sample stream being conditioned is a water vapor containing gas stream, the water vapor will condense and separate from the sample stream in the cooling section 24. The water vapor will run down through tube 40 into vessel 46 which is sealed to the lower arm 48 of junction tube 40. Thus it can readily be seen that some of the sample gas and the condensed water pass downwardly into the vessel 46 and the remainder of the sample gas will pass upwardly through the conduit tube 10 where it is conditioned.

A container 50 for an analytical instrument, for example, an oxygen analyzer, is mounted on the outlet 14 of conduit tube 10 so that the conditioned sample gas passes therethrough. A sample stream discharge line 52 passes downwardly from instrument container 50 into and is sealed in the condensed water vessel 46. Outlet pipe 54 from vessel 46 leads to a suitable vacuum or suction pump, indicated as venturi pump 56, which can also be connected to the same source of compressed gas as supply line 26, so that suction is applied to vessel 46 and the sample gas and condensed water are pulled therefrom, whereby the fluid sample stream is pulled through conduit 10 and instrument container 50.

Normally only a small quantity of the incoming fluid sample stream will be passed through the conduit tube 10 and the analytical instrument container 50. The great bulk of the fluid sample stream will pass downwardly through lower arm 48 into vessel 46 and then out of the system through outlet pipe 54. The lower arm 48 of junction tube 40 and the discharge line 52 from the instrument container 50 are positioned relative to one another in vessel 46 to affect the desired fractioning of the sample gas stream. To increase the flow through discharge line 52, for example, it is raised relative to lower arm 48.

In operation, the fluid sample stream enters through base 44 of junction tube 40 and is split into two parts, one part passing downwardly through lower arm 48 directly into vessel 46 and the other part passing upwardly through upper arm 42 into the inlet 12 of the conduit tube 10. A gas under pressure, such as compressed air, is passed into vortex tube 28 where it separates into two exit streams, a heated stream and a cooled stream. The cooled stream passes through pipe 32 into heat exchange relationship in cooling section 18 of jacket 16 with the fluid sample stream so that the fluid sample is cooled. If the fluid sample stream is a water vapor containing gas stream, the sample stream desirably is cooled sufficiently to condense the water vapor, which will run down the inside of conduit tube 10 and junction tube 40 into vessel 46. The heated stream from the vortex tube 28 passes through pipe 30 and regulator valve 38 into the upper or heating section 20 of jacket 16 where it is in heat exchange relationship with the cooled fluid sample and heats the fluid sample. Thus, the fluid sample, its temperature having been raised, is no longer saturated with water vapor and water vapor is not likely to condense out in instrument container 50, interfering with the analyses of the gas stream. The heated fluid stream then passes through container 50 where it is analyzed, for example, for oxygen content. The same source of compressed air which is attached to supply line 26 for the vortex tube may be connected to a vacuum pump 56 for drawing a suction on vessel 46. Since discharge line 52 extends into the vessel 46 from instrument container 50, this also pulls the sample stream through the conduit 10 and instrument container 50 where it is analyzed. Only a portion of the fluid sample stream is passed into heat exchange relationship with the gas streams from the vortex tube and the remainder passes directly into vessel 46 with the condensed water.

It will be appreciated that the foregoing is only a description of one process and one form of apparatus embodying the principles of the instant invention. This is for illustrative purposes and the instant invention is not to be limited thereby but only by the claims wherein what is claimed is:

1. Apparatus for conditioning a fluid sample stream which comprises:
   a. a fluid conduit having an inlet and an outlet;
   b. a hollow heat exchange jacket, having a cooling section and a heating section, surrounding the conduit so as to form a heating section and a cooling section in the conduit;
   c. a vortex tube;
   d. means for introducing a gas under pressure into the vortex tube so that the gas separates into two exit streams from the vortex tube, a heated stream and a cooled stream;
   e. means for passing the heated gas stream into the heating section of the heat exchange jacket;
   f. means for passing the cooled gas stream into the cooling section of the heat exchange jacket;
   g. means for passing the fluid sample stream through the conduit, traveling through the section surrounded by the cooling section of the jacket and through the section surrounded by the heating section, whereby the fluid sample stream is cooled and heated.

2. The apparatus of claim 1 wherein the two sections of the heat exchange jacket are separated from one another.

3. The apparatus of claim 1 including means for controlling the temperature differential between the heating and cooling sections.

4. The apparatus of claim 3 wherein the control means is positioned so as to regulate the passage of the heated gas stream from the vortex tube into the heating section of the heat exchange jacket.

5. The apparatus of claim 1 wherein the conduit is a generally vertically disposed tube.

6. The apparatus of claim 5 wherein the cooling section is below the heating section.

7. The apparatus of claim 5 wherein the fluid sample stream is a water vapor containing gas stream and the cooling section is below the heating section, water vapor condensing and separating from the sample stream in the cooling section, and including as an additional element, means for collecting the condensed water.

8. The apparatus of claim 7 including a container for an analytical instrument mounted on the outlet of the conduit so that the conditioned sample stream passes therethrough.

9. The apparatus of claim 8 including the following additional elements:
   a. a vertically disposed junction tube connected at its upper arm to the inlet of the conduit, and at its base to a source of sample gas;
   b. a vessel for collecting condensed water sealed to the lower arm of the junction, so that some of the sample gas and the condensed water pass downwardly into the vessel and the remainder of the sample gas passes upwardly through the conduit, whereby it is conditioned.

10. The apparatus of claim 9 including the following additional elements:
   a. a sample stream discharge line from the instrument container extending downwardly into and sealed in the condensed water vessel;
   b. means for applying suction to the vessel so that the sample gas and condensed water are pulled therefrom, whereby the fluid sample stream is pulled through the conduit and instrument container.

11. The apparatus of claim 10 wherein the means for applying suction is a vacuum pump.

12. The apparatus of claim 10 wherein the lower arm of the junction tube and the discharge line from the instrument container are positioned relative to one another in the vessel so that the amount of sample gas from the source passing through the conduit is controlled.

13. The method of conditioning a fluid sample stream which comprises:
   a. passing a gas under pressure into a vortex tube so that the gas separates into two exit streams from the vortex tube, a heated stream and a cooled stream;
   b. passing the cooled stream into heat exchange relationship with the fluid sample stream so that the fluid sample is cooled;
   c. passing the heated stream into heat exchange relationship with the fluid sample stream so that the fluid sample is heated, whereby the fluid sample stream is conditioned.

14. The method of claim 13 wherein the fluid sample stream is flowing generally upward.

15. The method of claim 13 including the additional step of regulating the flow of the heated gas stream so that the temperature differential between the heated and cooled gas stream is controlled.

16. The method of claim 13 wherein the fluid sample stream is a water vapor containing gas stream and the sample stream is cooled sufficiently by heat exchange with the cooled gas stream to condense the water vapor, and including the additional step of separating the condensed water from the sample stream.

17. The method of claim 16 including the additional step of:
a. passing only a portion of the fluid sample stream into heat exchange relationship with the gas streams from the vortex tube;
b. separating the remainder of the sample stream with the condensed water.

* * * * *